(12) United States Patent
Polaganga et al.

(10) Patent No.: US 12,532,337 B2
(45) Date of Patent: Jan. 20, 2026

(54) FREQUENCY LAYER MANAGEMENT USING OTA PERFORMANCE TESTS OF A MOBILE DEVICE

(71) Applicant: T-Mobile USA, Inc., Bellevue, WA (US)

(72) Inventors: Roopesh Kumar Polaganga, Bothell, WA (US); Madhav Ram Nusetty, Snohomish, WA (US); Amembal Vikram Pai, Bothell, WA (US); Satish Pachalla, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 327 days.

(21) Appl. No.: 18/459,305

(22) Filed: Aug. 31, 2023

(65) Prior Publication Data

US 2025/0081218 A1    Mar. 6, 2025

(51) Int. Cl.
*H04W 72/51* (2023.01)
*H04W 72/0453* (2023.01)
*H04W 72/563* (2023.01)

(52) U.S. Cl.
CPC ....... *H04W 72/51* (2023.01); *H04W 72/0453* (2013.01); *H04W 72/563* (2023.01)

(58) Field of Classification Search
None
See application file for complete search history.

(56) References Cited

U.S. PATENT DOCUMENTS

| | | |
|---|---|---|
| 6,192,224 B1 | 2/2001 | Grayson et al. |
| 7,430,420 B2 | 9/2008 | Derakhshan et al. |
| 7,536,205 B2 | 5/2009 | Van et al. |
| 7,555,294 B2 | 6/2009 | Qi et al. |
| 7,953,034 B2 | 5/2011 | Lee et al. |
| 8,036,600 B2 | 10/2011 | Garrett et al. |
| 8,072,932 B2 | 12/2011 | Sun et al. |
| 8,229,432 B2 | 7/2012 | Fox et al. |
| 8,254,328 B2 | 8/2012 | Yoshida et al. |
| 8,744,470 B2 | 6/2014 | Weinrib et al. |
| 9,374,769 B2 | 6/2016 | Kherani et al. |
| 9,445,421 B2 | 9/2016 | Levine et al. |

(Continued)

FOREIGN PATENT DOCUMENTS

| | | |
|---|---|---|
| CN | 109661008 B | 7/2021 |
| CN | 109803294 B | 9/2021 |

(Continued)

*Primary Examiner* — Phirin Sam
(74) *Attorney, Agent, or Firm* — Perkins Coie LLP

(57) ABSTRACT

Various implementations generally relate to systems and methods for utilizing TIS and TRP ratings of a mobile device to identify frequency layers to prefer or avoid. A network access node detects a first frequency layer being utilized by the mobile device and generates an output based on a comparison of a capability of the mobile device to a capability threshold of the first frequency layer. Based on the output, the network access node determines whether the capability of the mobile device satisfies the capability threshold of the first frequency layer. If the capability of the mobile device does not satisfy the capability threshold, the network access node causes the mobile device to stop using the first frequency layer for communicating on the telecommunications network.

20 Claims, 5 Drawing Sheets

(56) References Cited

U.S. PATENT DOCUMENTS

| | | |
|---|---|---|
| 9,462,553 B2 | 10/2016 | Gopal et al. |
| 9,474,071 B2 | 10/2016 | Dahlen |
| 9,497,702 B2 | 11/2016 | Joung et al. |
| 9,924,426 B2 | 3/2018 | Wang et al. |
| 10,057,844 B2 | 8/2018 | Lau |
| 10,231,157 B2 | 3/2019 | Jung et al. |
| 11,064,064 B2 | 7/2021 | Ahluwalia et al. |
| 11,490,329 B1 | 11/2022 | Artuso |
| 11,711,862 B1 | 7/2023 | Patel |
| 2010/0034160 A1 | 2/2010 | Prakash et al. |
| 2010/0074159 A1 | 3/2010 | Yamada et al. |
| 2011/0176424 A1 | 7/2011 | Yang et al. |
| 2022/0287036 A1 | 9/2022 | Mildh |
| 2022/0322366 A1 | 10/2022 | Yu et al. |
| 2023/0121583 A1* | 4/2023 | Basu Mallick ... H04W 72/0453 370/329 |
| 2023/0209453 A1 | 6/2023 | Basu Mallick et al. |
| 2023/0261814 A1 | 8/2023 | Yerramalli et al. |
| 2024/0064685 A1* | 2/2024 | Manolakos ........... H04L 1/0068 |

FOREIGN PATENT DOCUMENTS

| | | |
|---|---|---|
| CN | 109871816 B | 9/2022 |
| CN | 111556528 B | 2/2023 |
| CN | 111885673 B | 3/2023 |
| CN | 114900844 B | 6/2023 |
| EP | 2557841 A1 | 2/2013 |
| JP | 4901582 B2 | 1/2012 |
| JP | 2016039554 A | 3/2016 |
| KR | 100821176 B1 | 4/2008 |
| KR | 101176371 B1 | 8/2012 |
| KR | 102481795 B1 | 12/2022 |
| WO | 2010076393 A1 | 7/2010 |
| WO | 2022154525 A1 | 7/2022 |

* cited by examiner

FREQUENCY LAYER MANAGEMENT USING OTA PERFORMANCE TESTS OF A MOBILE DEVICE

BACKGROUND

Over-the-air (OTA) performance testing refers to an evaluation of the performance of a radio, including impact of the radiation pattern and interaction of the radio and device circuitry. Total radiated power (TRP) is a radio frequency engineering term used to describe the sum of all power radiated by an antenna connected to a transmitter and is closely related to the efficiency of the antenna. Total isotropic sensitivity (TIS) is the average sensitivity of a receiving antenna across the three-dimensional space. Cellular carriers refer to TRP and TIS as OTA performance tests that measure transmitting and receiving performances of a mobile device via a wireless connection.

BRIEF DESCRIPTION OF THE DRAWINGS

Detailed descriptions of implementations of the present invention will be described and explained through the use of the accompanying drawings.

Figure 1:
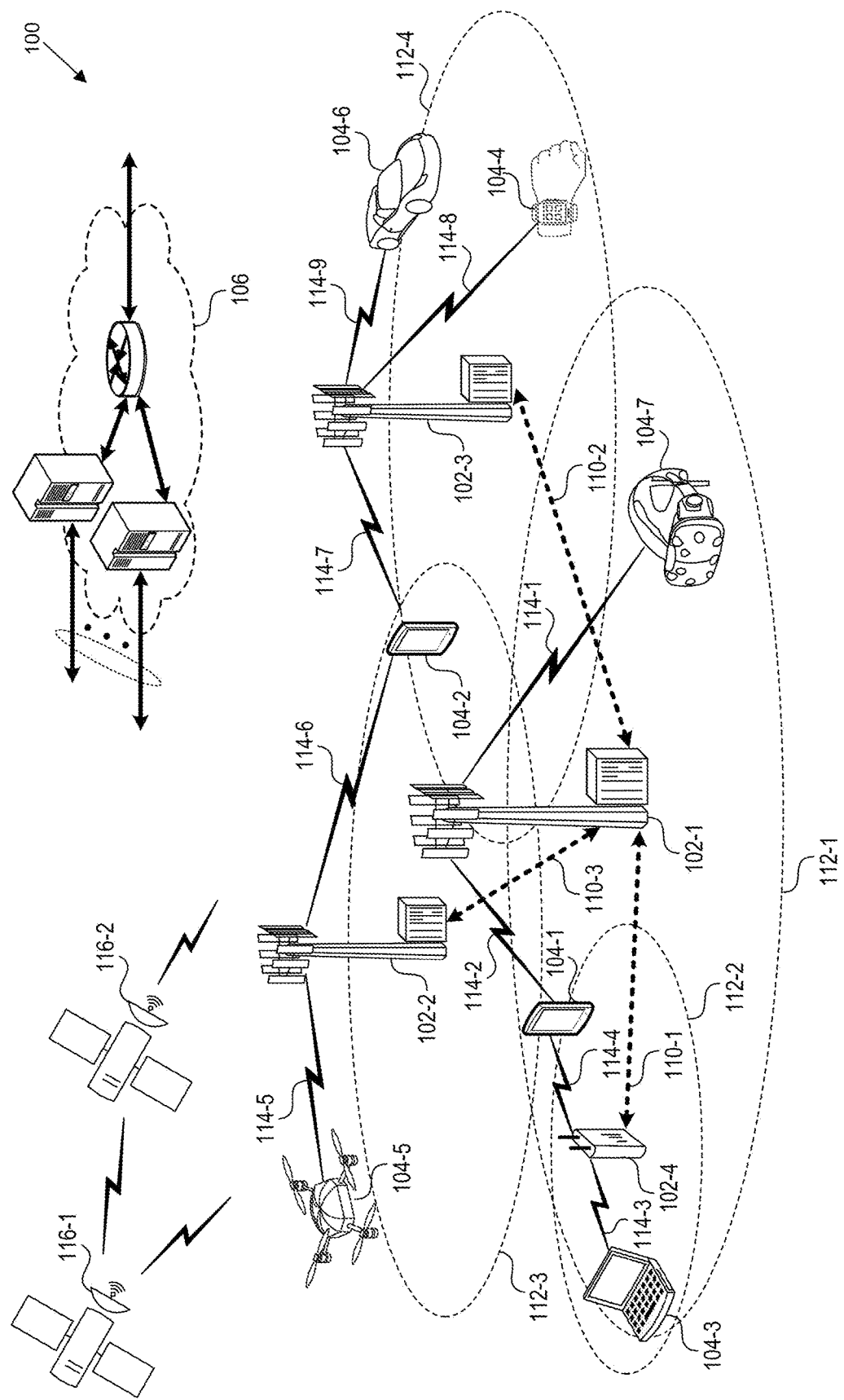
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technologies utilize total isotropic sensitivity (TIS) and total radiated power (TRP) ratings to identify frequency layers to prefer or avoid for a particular mobile device model. In particular, mobile devices utilize multiple frequency layers for communicating on a telecommunications network. Currently, network operators of telecommunications networks predefine priorities for frequency layers based on bandwidths and nature of frequency band (e.g., low, mid, and high bands) of the frequency layers. When selecting a frequency band layer, network operators also consider user equipment (UE) capabilities, such as beam steering in mmWave and New Radio carrier aggregation (NRCA) that combines multiple carriers into a single data channel to enhance data capacity of the network. However, prior frequency layer selection mechanisms do not consider TIS and TRP ratings that are specific to each device model of UE.

In one embodiment, a network server of a telecommunications network identifies a frequency layer being utilized by a mobile device. The telecommunications network supports multiple frequency layers that are each assigned a priority based on bandwidths and nature of the frequency layers. For each mobile device model, the network server calculates optimal ranges of TIS and TRP to identify thresholds for each frequency layer that must be satisfied to optimize transmit and receive performance of the mobile device. The network server compares a capability of the mobile device against server-defined capability thresholds associated with the frequency layer. Upon determining that the mobile device capability is not within the server-defined capability thresholds, the network server indicates that the frequency layer is not optimal for communicating by the mobile device. The network server can then identify another frequency layer and switch the mobile device to the identified frequency layer.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a UE, a customer premises equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements (QoS) and multi-terabits-per-second data transmission in the 6G and beyond era, such as terabit-per-second backhaul systems, ultrahigh definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

Figure 2:
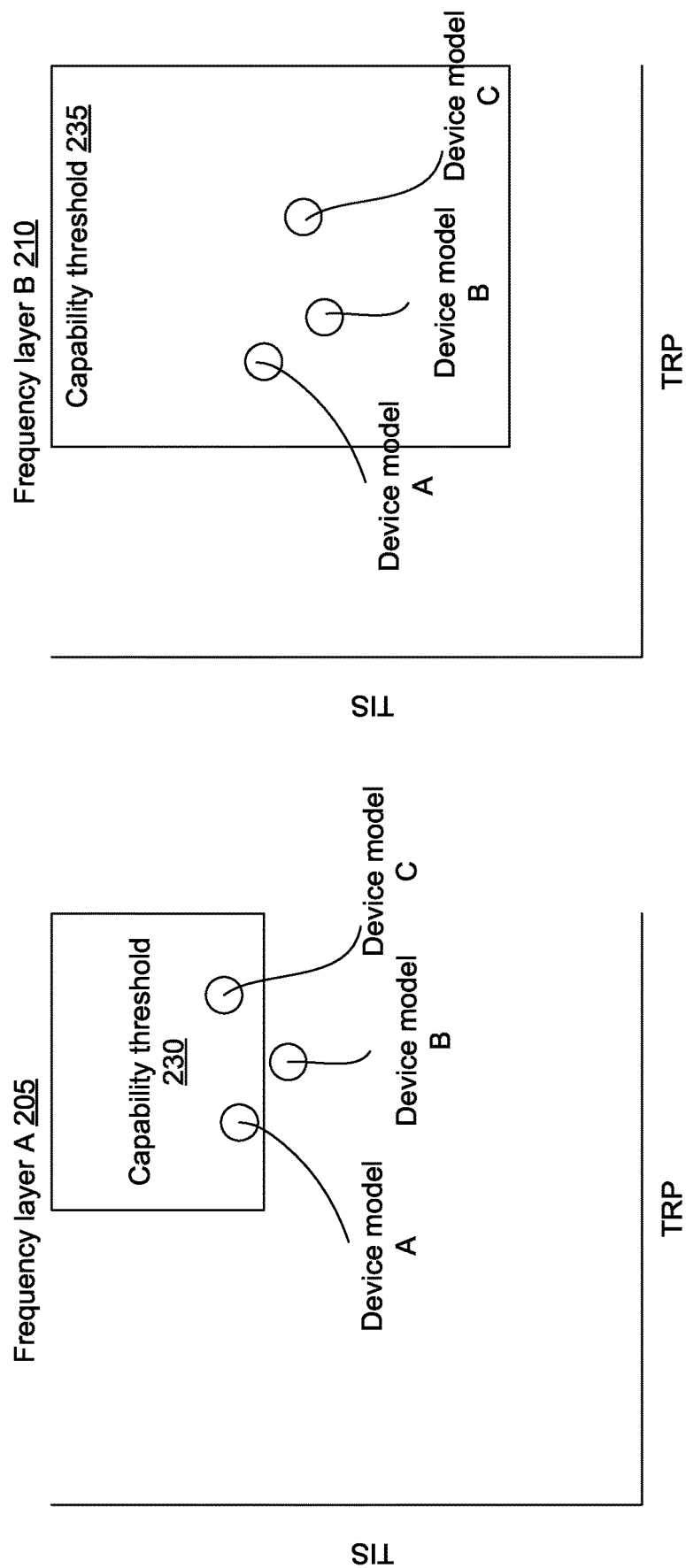
FIGS. 2A and 2B are plots that illustrate comparison of TIS and TRP ratings of mobile device models to capability thresholds of multiple frequency layers that can implement aspects of the present technology.

FIGS. 2A and 2B are plots that illustrate comparison of TIS and TRP ratings of mobile device models to capability thresholds of multiple frequency layers that can implement aspects of the present technology. Each mobile device model has unique TIS and TRP ratings associated with the mobile device model, and a network access node of a telecommunications network can receive TIS and TRP ratings of mobile device models from an external source.

The telecommunications network can support multiple frequency layers, such as frequency layer A 205 of FIG. 2A and frequency layer B 210 of FIG. 2B. Each frequency layer of the multiple frequency layers can be utilized by mobile devices of the telecommunications network for communication over the telecommunications network. Each frequency layer exhibits different communication characteristics. For example, a low band frequency layer provides greater coverage but lower speeds, whereas a high band frequency layer provides higher speeds but a smaller coverage radius. The network access node of the telecommunications network can define layer priorities of the multiple frequency layers based on the observed characteristics of the multiple frequency layers.

The disclosed technologies utilize TIS and TRP ratings of the mobile device models to proactively prefer or avoid certain frequency layers over others for each mobile device model. TIS and TRP ratings measure the transmit and receive performance of the mobile device models via a wireless connection. TIS and TRP ratings vary for each mobile device model due to various factors, such as antenna placement within the mobile device, components that make up the wireless communication system within the mobile device, spacing and geometry of metal parts of the mobile device, and PCB ground plane length. Therefore, newer mobile device models do not necessarily indicate higher TIS and TRP ratings and higher wireless communication performance.

As shown in FIGS. 2A and 2B, each frequency layer of the multiple frequency layers can have an associated capability threshold that indicates ranges of TIS and TRP ratings that are identified as satisfactory to transmit and receive performance for mobile devices operating using the associated frequency layer. Frequency layer A 205 is associated with capability threshold 230, and frequency layer B 210 is associated with capability threshold 235. The capability threshold differs for each frequency layer due to the different characteristics exhibited by each frequency layer.

Once the capability thresholds for the multiple frequency layers are defined, each mobile device model can be identified and marked in the TIS/TRP ratings plot to determine performance suitability of each mobile device model in the multiple frequency layers. As shown in FIG. 2A, device models A and C have TIS and TRP ratings that satisfy the capability threshold 230 of the frequency layer A 205, which indicates that device models A and C are able to transmit and receive performance in the frequency layer A 205 without experiencing difficulty. In contrast, device model B, which has a TRP rating within range of the capability threshold 230 but has a TIS rating below the capability threshold 230, is deemed unsatisfactory. Such information can be relayed to the network access node of the telecommunications network, and the network access node can determine that device model B should avoid communication over frequency layer A 205.

In FIG. 2B, device models A, B, and C all have TIS and TRP ratings that satisfy the capability threshold 235 of the frequency layer B 210. Therefore, when such information is relayed to the network access node of the telecommunications network, the network access node can determine that device models A, B, and C prefer communication over frequency layer B 210 and adjust layer priorities for each device model accordingly.

Figure 3:
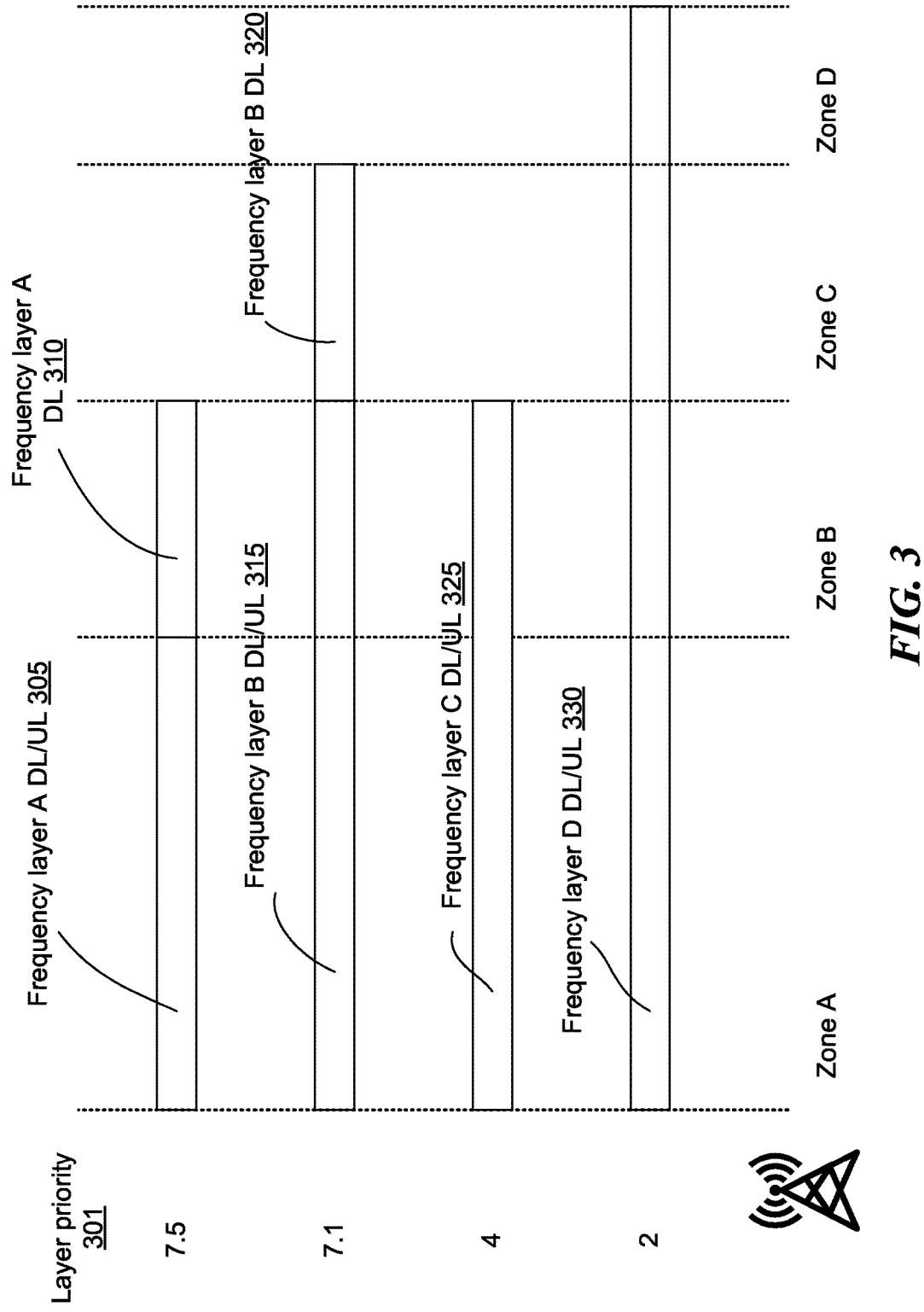
FIG. 3 is a chart that illustrates multiple frequency layers that can implement aspects of the present technology.

FIG. 3 is a chart that illustrates multiple frequency layers that can implement aspects of the present technology. As explained above, the telecommunications network supports multiple frequency layers that are each assigned a priority based on bandwidths and nature of the multiple frequency layers. The multiple frequency layers can span over one or more zones, each zone having unique characteristics, such as supporting TDD where uplink and downlink communications are sent on the same frequency layer, supporting only TDD downlink, or supporting only low band.

The chart can be used by network operators to assign and visualize priorities of the multiple frequency layers. For example, the example frequency layer priority chart for device model B 300 includes multiple layers, each assigned different layer priorities 301. Frequency layers that have higher layer priority 301 can indicate that device model B is likely to perform better in such frequency layers. As shown in FIG. 3, frequency layer A has a layer priority of 7.5, whereas frequency layer B has a layer priority of 7.1. In some embodiments, frequency layers can span over multiple zones, each zone having unique characteristics. Zone A may support frequency layer A downlink and uplink 305, whereas zone B may support only frequency layer A downlink 310. Zones A and B may both support frequency layer B downlink and uplink 315, whereas zone C may support only frequency layer B downlink 320. Some frequency layers, such as frequency layers C and D, are configured such that the zones supporting downlink and uplink communication are identical. Both zones A and B may support frequency layer C downlink and uplink 325, and zones A-D may support frequency layer D downlink and uplink 330.

As shown in FIG. 3, although frequency layer A spans over fewer zones than frequency layer B, device model B may prefer frequency layer A over frequency layer B for various reasons, such as nature of the frequency band and device model capability-based steering of devices to specific frequency layers. Network operators can combine information regarding the priorities of the multiple frequency layers based on the frequency layer priority chart with the TIS and TRP ratings of the mobile device models to make changes to the priorities of the multiple frequency layers.

Figure 4:
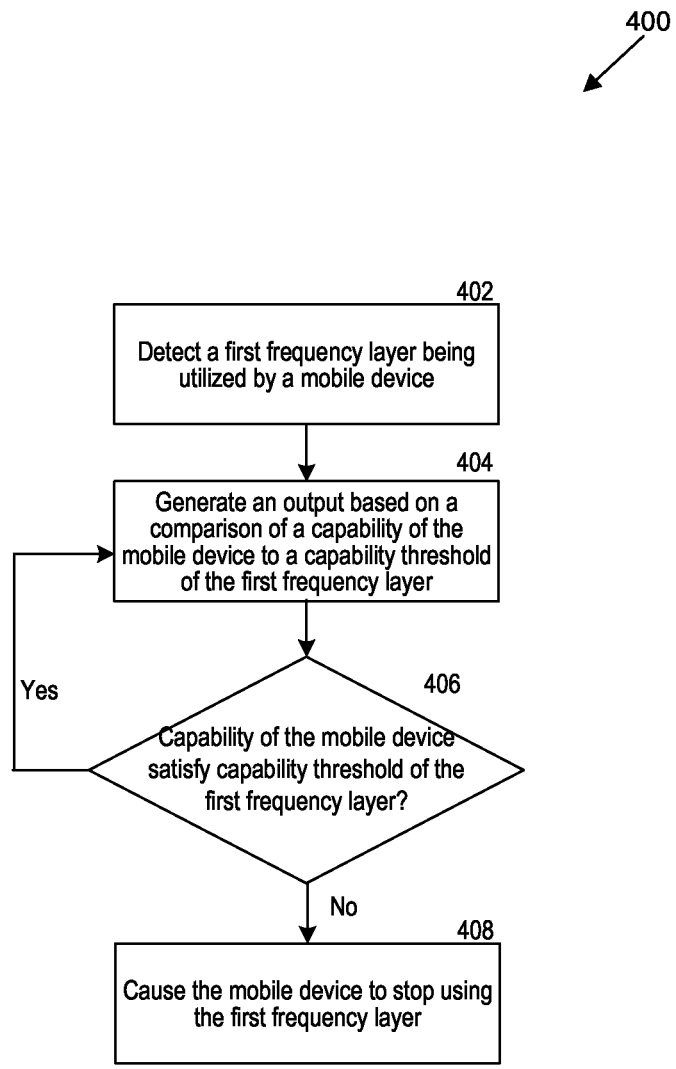
FIG. 4 is a flowchart of an embodiment of a process for switching from a frequency layer to another frequency layer based on comparison of device capability of a mobile device to a server-defined threshold.

FIG. 4 is a flowchart of an embodiment of a process for switching from a frequency layer to another frequency layer based on comparison of device capability of a mobile device to a server-defined capability threshold. The process 400 can be performed by a network access node of a telecommunications network in some implementations. Other implementations of the process 400 include additional, fewer, or different processes or include performing processes in different orders.

At 402, the network access node detects a first frequency layer being utilized by a mobile device for communication on the telecommunications network. As explained with regard to FIG. 3, the telecommunication network can support multiple frequency layers, each frequency layer being assigned different priorities. In some implementations, the priorities of the multiple frequency layers are determined based on device specific capabilities, such as mmWave aware steer capability of the mobile device. In other implementations, the network access node dynamically updates the priorities of the multiple frequency layers. Additionally, the network access node can save the updated priorities of the multiple frequency layers in a memory within the network server of the telecommunications network.

At 404, the network access node generates an output based on a comparison of a capability of the mobile device to a capability threshold of the first frequency layer being utilized by the mobile device. In some implementations, the output can be a binary value indicating whether the capability of the mobile device is within the capability threshold of the first frequency layer. The capability of the mobile device can include the TIS and TRP ratings of the mobile device. In some implementations, the capability of the mobile device can include other capabilities, such as mmWave aware steering capability. The capability threshold of the first frequency layer can indicate ranges of TIS and TRP that are identified as satisfactory to transmit and receive performance for the mobile device in the first frequency layer. In some implementations, the capability threshold of the first frequency layer varies depending on the characteristics of the first frequency layer.

At 406, based on the output generated, the network access node determines whether the capability of the mobile device satisfies the capability threshold of the first frequency layer. The capability of the mobile device can be deemed to satisfy the capability threshold of the first frequency layer when both the TIS and the TRP of the mobile device are within the range of the TIS and TRP of the capability threshold of the first frequency layer. For example, if the TIS of the mobile device is within the range of the TIS of the capability threshold of the first frequency layer but the TRP of the mobile device is outside the range of TRP of the capability threshold of the first frequency layer, the capability of the mobile device does not satisfy the capability threshold of the first frequency layer.

At 408, the network access node identifies a second frequency layer to switch the mobile device to upon determining that the device capability of the mobile device is below the capability threshold of the first frequency layer. The second frequency layer may have a next highest priority, and the network access node can cause the mobile device to automatically switch from using the first frequency layer to using the second frequency layer for future communications on the telecommunications network. In some implementations, in response to determining that the capability of the mobile device does not satisfy the capability threshold, the network access node causes the mobile device to perform a predefined action for communicating on the telecommunications network.

For the sake of brevity, the process for identification of the second frequency layer has been omitted, but multiple factors can be involved in identifying the second frequency layer to switch the mobile device to. In some implementations, in addition to determining that the TIS and TRP ratings of the mobile device fall below the capability threshold of the first frequency layer, the network access node also determines whether the mobile device is NRCA capable. If the mobile device with TIS and TRP ratings outside of the capability threshold of the first frequency layer is NRCA capable, the network access node can compare the bandwidth of the first frequency layer with aggregated bandwidth of multiple target frequency layers. If the aggregated bandwidth of the multiple target frequency layers is less than the bandwidth of the first frequency layer, the network access node can determine that switching the mobile device to the multiple target frequency layers is not desirable even though the capability of the mobile device is outside of the capability threshold of the first frequency layer. In some implementations, the network access node compares the aggregated bandwidth of the multiple target frequency layers to an operator defined threshold. Additionally or alternatively, the network access node can identify that the mobile device is NRCA capable and is utilizing multiple frequency layers. If the aggregated bandwidth of the multiple frequency layers being utilized is less than a network operator defined threshold, the network access node can determine that it is desirable to switch the mobile device to another frequency layer. For example, the network operator defined threshold may be 100 MHz of bandwidth, and if the aggregated bandwidth of the multiple frequency layers being utilized is below 100 MHz, the network access node can prefer switching to a target frequency layer over the multiple frequency layers being utilized.

In some implementations, after determining that the capability of the mobile device does not satisfy the capability threshold of the first frequency layer, the network access node designates the first frequency layer as a frequency layer to avoid such that the mobile device automatically switches to use frequency layers other than the first frequency layer in future communications. The network access node can take further actions, such as disassociating the first frequency layer from the first priority of the different priorities associated with the mobile device.

Computer System

Figure 5:
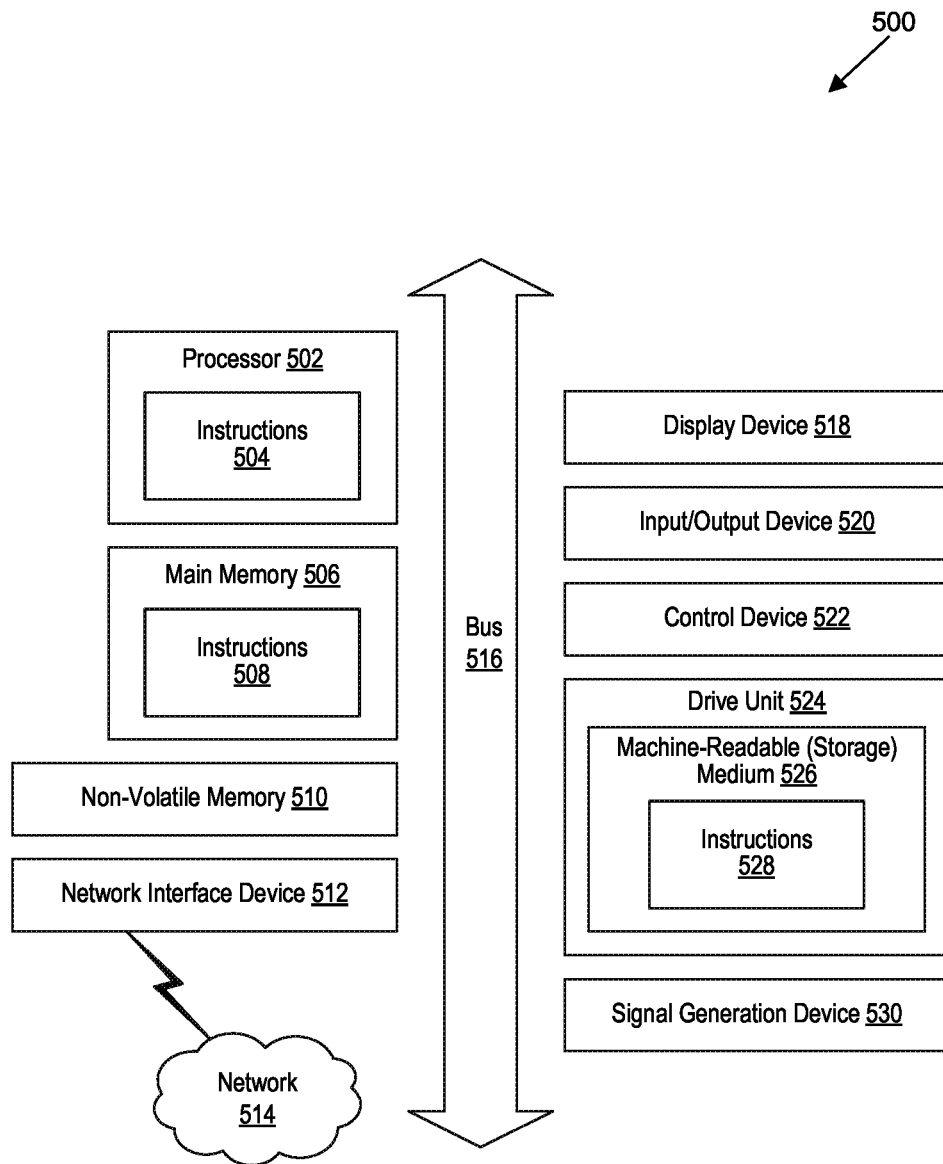
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, a video display device 518, an input/output device 520, a control device 522 (e.g., keyboard and pointing device), a drive unit 524 that includes a machine-readable (storage) medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementations, the computer system 500 can be an embedded computer system, a system-on-chip (SOC), a single-board computer system (SBC), or a distributed system such as a mesh of computer systems, or it can include one or more cloud components in one or more networks. Where appropriate, one or more computer systems 500 can perform operations in real time, in near real time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

The invention claimed is:

1. A method performed by a network access node of a telecommunications network, the method comprising:
   detecting a first frequency layer being utilized by a mobile device for communication on a telecommunications network,
      wherein the telecommunications network supports multiple frequency layers being assigned different priorities, and
      wherein the multiple frequency layers include the first frequency layer associated with a first priority of the different priorities;
   generating an output based on a comparison of a capability of the mobile device to a capability threshold of the first frequency layer,
      wherein the capability of the mobile device determines transmit and receive performance of the mobile device, the capability of the mobile device including total isotropic sensitivity (TIS) and total radiated power (TRP) of the mobile device, and
      wherein the capability threshold of the first frequency layer indicates ranges of TIS and TRP that are identified as satisfactory to transmit and receive performance for the mobile device in the first frequency layer;
   determining, based on the output, that the capability of the mobile device does not satisfy the capability threshold of the first frequency layer; and
   in response to determining that the capability of the mobile device does not satisfy the capability threshold, causing the mobile device to stop using the first frequency layer for communicating on the telecommunications network.

2. The method of claim 1, further comprising:
   identifying a second frequency layer of the multiple frequency layers for the mobile device,
      wherein the second frequency layer has a next priority compared to the first priority of the first frequency layer; and
   causing the mobile device to switch from using the first frequency layer to using the second frequency layer for communicating on the telecommunications network.

3. The method of claim 1, further comprising:
   designating the first frequency layer as a frequency layer to avoid such that the mobile device automatically switches to use frequency layers of the multiple frequency layers other than the first frequency layer; and
   disassociating the first frequency layer from the first priority of the different priorities.

4. The method of claim 1, further comprising:
   dynamically updating priorities of the multiple frequency layers; and
   saving the priorities of the multiple frequency layers in a memory.

5. The method of claim 1, wherein priorities of the multiple frequency layers are determined based on mmWave aware steering of the mobile device.

6. The method of claim 1, wherein the capability threshold of the first frequency layer depends on characteristics of the first frequency layer.

7. The method of claim 1, wherein determining that the capability of the mobile device does not satisfy the capability threshold of the first frequency layer further comprises:
   determining that the TIS of the mobile device is outside the range of TIS of the capability threshold of the first frequency layer; or
   determining that the TRP of the mobile device is outside the range of TRP of the capability threshold of the first frequency layer.

8. A non-transitory, computer-readable storage medium comprising instructions recorded thereon that, when executed by at least one processor of a system of a wireless telecommunications network, cause the system to:
   detect a first frequency layer being utilized by a mobile device for communication on a telecommunications network,
      wherein the telecommunications network supports multiple frequency layers being assigned different priorities, and
      wherein the multiple frequency layers include the first frequency layer associated with a first priority of the different priorities;
   generate an output based on a comparison of a capability of the mobile device to a capability threshold of the first frequency layer,
      wherein the capability of the mobile device determines transmit and receive performance of the mobile device, the capability of the mobile device including total isotropic sensitivity (TIS) and total radiated power (TRP) of the mobile device, and wherein the capability threshold of the first frequency layer indicates ranges of TIS and TRP that are identified as satisfactory to transmit and receive performance for the mobile device in the first frequency layer;

determine, based on the output, that the capability of the mobile device does not satisfy the capability threshold of the first frequency layer; and in response to determining that the capability of the mobile device does not satisfy the capability threshold, cause the mobile device to perform an action for communicating on the telecommunications network.

9. The non-transitory, computer-readable storage medium of claim 8, wherein the system is further caused to:

identify a second frequency layer of the multiple frequency layers for the mobile device, wherein the second frequency layer has a next priority compared to the first priority of the first frequency layer; and cause the mobile device to switch from using the first frequency layer to using the second frequency layer for communicating on the telecommunications network.

10. The non-transitory, computer-readable storage medium of claim 8, wherein the system is further caused to:

designate the first frequency layer as a frequency layer to avoid such that the mobile device automatically switches to use frequency layers of the multiple frequency layers other than the first frequency layer; and disassociate the first frequency layer from the first priority of the different priorities.

11. The non-transitory, computer-readable storage medium of claim 8, wherein the system is further caused to:

dynamically update priorities of the multiple frequency layers; and save the priorities of the multiple frequency layers in a memory.

12. The non-transitory, computer-readable storage medium of claim 8, wherein priorities of the multiple frequency layers are determined based on mmWave aware steering of the mobile device.

13. The non-transitory, computer-readable storage medium of claim 8, wherein the capability threshold of the first frequency layer depends on characteristics of the first frequency layer.

14. The non-transitory, computer-readable storage medium of claim 8, wherein determining that the capability of the mobile device does not satisfy the capability threshold of the first frequency layer further comprises causing the system to:

determine that the TIS of the mobile device is outside the range of TIS of the capability threshold of the first frequency layer; or determine that the TRP of the mobile device is outside the range of TRP of the capability threshold of the first frequency layer.

15. A system comprising:

at least one hardware processor; and at least one non-transitory memory storing instructions, which, when executed by the at least one hardware processor, cause the system to:

detect a first frequency layer of multiple frequency layers being utilized by a mobile device for communication on a telecommunications network, wherein each frequency layer of the multiple frequency layers is assigned different priorities;

generate an output based on a comparison of a capability of the mobile device to a capability threshold of the first frequency layer, wherein the capability of the mobile device includes total isotropic sensitivity (TIS) and total radiated power (TRP) of the mobile device, and wherein the capability threshold of the first frequency layer indicates ranges of TIS and TRP that are identified as satisfactory to transmit and receive performance for the mobile device in the first frequency layer;

determine, based on the output, that the capability of the mobile device does not satisfy the capability threshold of the first frequency layer; and in response to determining that the capability of the mobile device does not satisfy the capability threshold, cause the mobile device to perform an action for communicating on the telecommunications network.

16. The system of claim 15, wherein the at least one non-transitory memory storing instructions further cause the system to:

identify a second frequency layer of the multiple frequency layers for the mobile device, wherein the second frequency layer has a next priority compared to the first priority of the first frequency layer; and cause the mobile device to switch from using the first frequency layer to using the second frequency layer for communicating on the telecommunications network.

17. The system of claim 15, wherein the at least one non-transitory memory storing instructions further cause the system to:

designate the first frequency layer as a frequency layer to avoid such that the mobile device automatically switches to use frequency layers of the multiple frequency layers other than the first frequency layer; and disassociate the first frequency layer from the first priority of the different priorities.

18. The system of claim 15, wherein the at least one non-transitory memory storing instructions further cause the system to:

dynamically update priorities of the multiple frequency layers; and save the priorities of the multiple frequency layers in a memory.

19. The system of claim 15, wherein the capability threshold of the first frequency layer depends on characteristics of the first frequency layer.

20. The system of claim 15, wherein determining that the capability of the mobile device does not satisfy the capability threshold of the first frequency layer further comprises causing the system to:

determine that the TIS of the mobile device is outside the range of TIS of the capability threshold of the first frequency layer; or determine that the TRP of the mobile device is outside the range of TRP of the capability threshold of the first frequency layer.

* * * * *